(12) United States Patent
Brocas et al.

(10) Patent No.: US 8,304,475 B2
(45) Date of Patent: Nov. 6, 2012

(54) PROCESS FOR THE PRODUCTION OF A BITUMINOUS COMPOSITION

(75) Inventors: Stéphane Brocas, Montpellier (FR); Mohsen Ech, Lyons (FR); Nicolas Richard, Crémieu (FR); Emmanuel Villard, Saint-Christo-en-Jarez (FR); Hassan Baaj, Lyons (FR); Philippe Toubeau, Ruy (FR)

(73) Assignee: Lafarge, Paris (FR)

( * ) Notice: Subject to any disclaimer, the term of this patent is extended or adjusted under 35 U.S.C. 154(b) by 0 days.

(21) Appl. No.: 13/259,078

(22) PCT Filed: Apr. 1, 2010

(86) PCT No.: PCT/FR2010/050630
§ 371 (c)(1),
(2), (4) Date: Oct. 25, 2011

(87) PCT Pub. No.: WO2010/112784
PCT Pub. Date: Oct. 7, 2010

(65) Prior Publication Data
US 2012/0035302 A1    Feb. 9, 2012

(30) Foreign Application Priority Data
Apr. 3, 2009  (FR) ...................................... 09 01625

(51) Int. Cl.
*C08L 95/00*  (2006.01)
(52) U.S. Cl. ................................ 524/59; 524/60; 524/62
(58) Field of Classification Search .................... 524/59, 524/60, 62
See application file for complete search history.

(56) References Cited

U.S. PATENT DOCUMENTS

| | | | |
|---|---|---|---|
| 2,438,318 A | 3/1948 | Johnson | |
| 3,459,741 A | 8/1969 | Fried | |
| 3,725,312 A | 4/1973 | Panzer et al. | |
| 3,738,945 A | 6/1973 | Panzer | |
| 4,724,003 A | 2/1988 | Treybig et al. | |
| 4,895,600 A | 1/1990 | Chang et al. | |
| 4,967,008 A | 10/1990 | Friedli et al. | |
| 5,160,453 A | 11/1992 | Schilling | |
| 5,224,990 A | 7/1993 | Vicenzi et al. | |
| 5,292,441 A | 3/1994 | Chen et al. | |
| 5,529,621 A | 6/1996 | Hudson et al. | |
| 6,855,754 B2 | 2/2005 | Takamura et al. | |
| 7,045,580 B2 | 5/2006 | Mullay et al. | |

FOREIGN PATENT DOCUMENTS

| | | |
|---|---|---|
| EP | 0 077 632 | 4/1983 |
| EP | 0 773 266 B1 | 1/1999 |
| EP | 1 111 010 B1 | 11/2005 |
| FR | 1 042 084 | 10/1953 |
| FR | 2 864 100 | 6/2005 |
| GB | 1386855 | 3/1975 |
| WO | WO 96/25475 | 8/1996 |
| WO | WO 2005/012433 | 2/2005 |

OTHER PUBLICATIONS

International Search Report for PCT/FR2010/050630.
Northstone (NI) Ltd Quarry & Asphalt Division; European Aggregate Sizes (BS EN 13043), Internet Citation, pp. 1-5, URL:http://www.northestonematerials.com/filestore/documetns/euro-aggregates.p.
Woodward, David et al., "Clay in Rocks", 2002 Society of Chemical Industry; SCI Lecture Paper Series; URL:http://www.soci.org.

*Primary Examiner* — Peter Szekely
(74) *Attorney, Agent, or Firm* — Pillsbury Winthrop Shaw Pittman, LLP

(57) ABSTRACT

A process for the production of a bituminous composition, includes (i) producing a mix of aggregates with a maximum diameter less than or equal to 30 mm and of an amount less than or equal to 0.8 g per square meter of specific surface developed by the aggregates of at least one cationic polymer in the liquid form having a density of cationic charges greater than or equal to 0.5 meq/g and an intrinsic viscosity of from 0.01 to 0.8 dl/g; and (ii) putting the mix obtained in stage (i) into contact with at least one bituminous binder. A bituminous composition includes at least one specific cationic polymer and the use of at least one specific cationic polymer in the surface treatment of aggregates intended for the preparation of a bituminous composition are the other two subject-matters of the present invention.

8 Claims, 1 Drawing Sheet

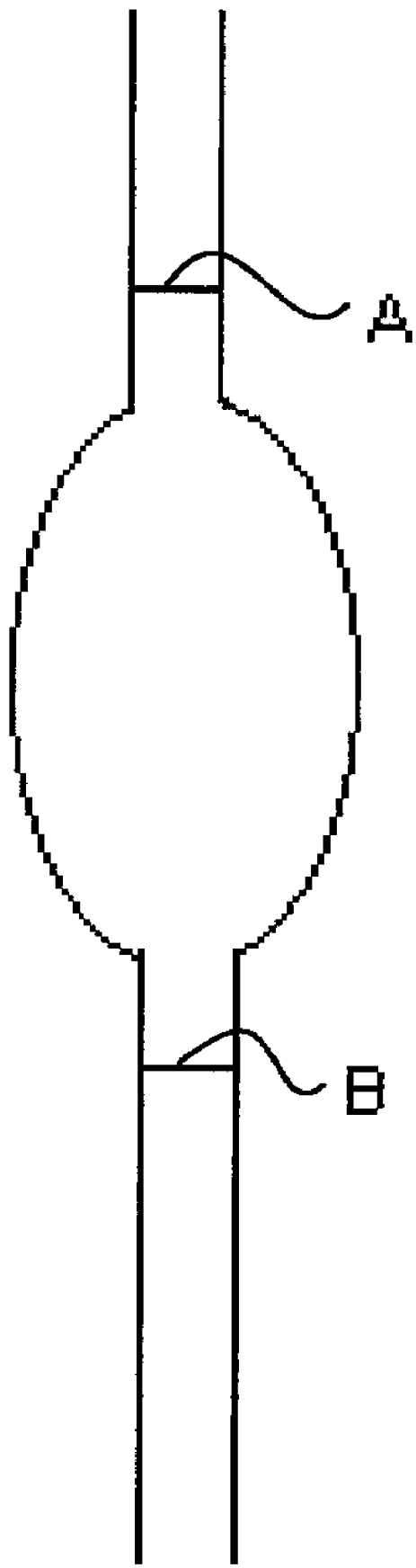

PROCESS FOR THE PRODUCTION OF A BITUMINOUS COMPOSITION

CROSS-REFERENCE TO RELATED APPLICATIONS

This is the U.S. National Stage of PCT/FR2010/050630, filed Apr. 1, 2010, which in turn claims priority to French Patent Application No. 0901625, filed Apr. 3, 2009, the entire contents of all applications are incorporated herein by reference in their entireties.

The subject-matter of the present invention is a process for the production of a bituminous composition comprising a stage of mixing aggregates and at least one specific cationic polymer, then a stage in which the mix is put into contact with at least one bituminous binder. A bituminous composition comprising at least one specific cationic polymer and the use of at least one specific cationic polymer in the surface treatment of aggregates intended for the preparation of a bituminous composition are the other two subject-matters of the present invention.

Bituminous compositions are widely used, in particular for the construction or repair of roadways. The bituminous compositions can be produced according to several methods: coating with a bituminous binder emulsion, coating with a heated bituminous binder or chip sealing.

The coating with a bituminous binder emulsion consists of a mix between wet aggregates and a bituminous binder emulsion. The major problem of this technique is the difficulty of controlling the formation of a film of bituminous binder from an emulsion in the presence of any type of aggregates. Good adhesion between the aggregates and the bituminous binder is not always assured.

The coating with a heated bituminous binder consists of a mix of dried and optionally heated aggregates with a heated bituminous binder. The major problem of this technique is related to the emission of fumes due to the high temperatures (generally between 90° C. and 200° C.) and to the high energy cost due to the stage of drying the aggregates.

Chip sealing consists of the application of a bituminous emulsion to a road to be repaired, for example, then the application of unheated aggregates and finally the passage of a road roller. The major disadvantage of this technique is the reduced contact surface area between the aggregates and the bituminous binder. Good adhesion between the aggregates and the bituminous binder is then essential in order to assure a satisfactory lifetime for the bituminous composition.

Whatever the method of preparation of the bituminous composition, the nature and the cleanness of the aggregates used can be major criteria for the quality of the bituminous compositions, in particular when the latter are exposed to water or to moisture. By way of example, stripping phenomena may be observed, that is to say that the bituminous binder/aggregates adhesion is no longer assured or then only partially assured. Furthermore, the moisture resistance of the bituminous compositions may be reduced, that is to say that the mechanical strengths of the bituminous compositions may greatly decrease after prolonged contact with water.

There exist standards to determine the criteria which the aggregates have to respect in order to be able to be used in a bituminous composition (see in particular Standard NF EN 13043). In point of fact, the criteria determined by the standards are such that a significant part of the aggregates extracted from quarries may be put aside and thus not be used in the production of bituminous compositions. There thus exists a need to exploit these aggregates, currently unusable in the production of bituminous compositions.

In order to solve the cleanness problem of the aggregates, one or more washing operations on the aggregates during the production of the bituminous compositions are known in order to reduce the content of harmful impurities and thus to increase the cleanness of the aggregates used. It is sometimes necessary to carry out several cleaning operations on the aggregates in order to obtain the desired quality. Nevertheless, these washing operations require major investments and a water supply close to the production site. Moreover, the presence of water subsequent to the washing can present problems with regard to the adhesion between the bituminous binder and the aggregates.

Furthermore, there exist standards to evaluate the compatibility between the aggregates and the bituminous binders and to judge the quality of the adhesion (for example, the Duriez test according to Standard NF P98-251-1). The quality of the aggregates in themselves and the compatibility between the aggregates and the bituminous binders are indeed governed by different criteria. Aggregates which respect the criteria, determined by the standards to be able to be used in a bituminous composition, may not be compatible with the bituminous binder with which they should be used. The non-compatibility between the aggregates and the bituminous binders may result in adhesion problems.

In order to solve the adhesion problem, there exist chemical agents, known as "adhesion dopes", which are added directly to the bituminous binder. However, there exists a problem of waste of these chemical agents as it is believed that only a portion of the products is actually found at the interface between the bituminous binder and the aggregates, in comparison with the total amount added to the bituminous binder. Consequently, there exists a need for a solution which makes it possible to improve the ratio of the amount added to the effectiveness of the chemical agents used and to thus reduce the waste of such agents.

In order to meet to the requirements of manufacturers, it has become necessary to develop an alternative treatment of the aggregates to washing and making it possible to improve the bituminous binder/aggregates adhesion in bituminous compositions.

Consequently, the problem which the invention intends to solve is that of providing a novel means adapted to improve the adhesion of the bituminous binder to the aggregates in bituminous compositions.

Unexpectedly, the inventors have shown that it is possible to use a specific cationic polymer to treat the aggregates intended for the production of bituminous compositions and thus improve the adhesion of the bituminous binder to the aggregates.

With this aim, the present invention provides a process for the production of a bituminous composition, comprising the following stages:

(i) producing a mix of aggregates with a maximum diameter which is non-zero and less than or equal to 30 mm and of an amount less than or equal to 0.8 g per square meter of specific surface developed by the aggregates of at least one cationic polymer in the liquid form having a density of cationic charges greater than or equal to 0.5 meq/g and an intrinsic viscosity of from 0.01 to 0.8 dl/g, the intrinsic viscosity being measured at 25° C. in a 3M NaCl solution with a capillary viscometer of the Ubbelhode type, the specific surface ($\Sigma_{sp}$) developed by the aggregates being determined according to the following Formula (I):

$$\Sigma_{sp}=(0.0025\times G)+(0.023\times S)+(0.12\times s)+(1.35\times f) \quad \text{Formula (I)}$$

in which:
G is the mass percentage of the aggregates having a diameter of from 6.3 to 30 mm;
S is the mass percentage of the aggregates having a diameter of from 0.315 to less than 6.3 mm;
s is the mass percentage of the aggregates having a diameter of from 0.08 to less than 0.315 mm;
f is the mass percentage of the aggregates having a diameter of strictly less than 0.08 mm; and
(ii) putting the mix obtained in stage (i) into contact with at least one bituminous binder.

The invention offers decisive advantages; in particular, the process according to the invention makes it possible to obtain bituminous compositions having improved moisture resistance, that is to say that the bituminous binder/aggregates adhesion of the bituminous compositions according to the invention after immersion in water or exposure to moisture is better than that of other bituminous compositions.

Advantageously, the present invention makes it possible to upgrade aggregates which do not respect the standards relating to aggregates for bituminous compositions (see in particular Standards XP P 18545, chapters 7 and 8, and NF EN 13043) and which it is consequently not possible to use. The process according to the invention makes it possible, for example, to use aggregates having a high methylene blue value, that is to say greater than 2 g, 2.5 g or 3 g of methylene blue per kilogram of aggregates, according to the target application.

Another advantage of the process according to the invention is that it does not have a negative effect on the usage properties of the bituminous compositions.

The process according to the invention furthermore has the advantage of preventing an overconsumption of water compared to the washing of conventionally-used aggregates.

The invention offers, as other advantage, that the cationic polymers according to the invention make it possible to significantly reduce the harmfulness of the clays naturally present in the aggregates.

Another advantage of the present invention is that the process according to the invention makes it possible to optimize the amount of cationic polymer compared to a direct addition to the bituminous binder before it is mixed with the aggregates.

Finally, the invention has the advantage of being able to be used in all industries, in particular the building industry, the chemical industry (admixture producers) and all the construction and sealing markets (building or civil engineering), roads or roof shingles.

Other advantages and characteristics of the invention will become clearly apparent on reading the description and examples, given purely by way of illustration and without implied limitation, which will follow.

The expression "bituminous composition" is understood to mean, according to the present invention, a composition comprising at least one bituminous binder and aggregates, such as, for example, bituminous concrete, bituminous-treated gravel, mastic asphalt or surface coatings based on bituminous emulsion. A bituminous composition according to the invention may further comprise typical additives, such as, for example, adhesion dopes or fibres (of glass, cellulose or asbestos, for example). A bituminous composition according to the invention may further comprise recycled materials, such as, for example, roof shingles, glass or concrete.

The expression "bituminous binder" is understood to mean, according to the present invention, a substance composed of a mix of hydrocarbons which is very viscous, even solid, at ambient temperature. A bituminous binder according to the invention can, for example, be natural bitumen or crude bitumen derived from oil (pure bitumens NF EN 12591, special bitumens of "hard" grade NF EN 13924, etc.). The bituminous binders according to the invention also comprise "green" binders that are so-called because they result from plant materials, such as, for example, colza oil.

The expression "aggregates" is understood to mean, according to the present invention, sands and/or coarse aggregates and/or unbound materials and/or fines (see Standards XP P 18545 and NF EN 13043). The aggregates according to the invention come from quarries or recycled materials (RAP, for example [Reclaimed Asphalt Pavement]).

The expression "polymer" is understood to mean, according to the present invention, a compound comprising more than two monomer units which are identical or different and which may or may not exhibit a particular order.

The expression "cationic polymer" is understood to mean, according to the present invention, a polymer for which the sum of the charges is positive. Preferably, the positive charges of the cationic polymer according to the invention are carried by quaternary amine groups and/or protonated amine groups.

The term "active material" is understood to mean, according to the present invention, a compound which has an effect on the aggregates and the bituminous binder in the context of their use in the production of a bituminous composition. In particular, the active material is not a solvent.

The invention relates to a process for the production of a bituminous composition, comprising the following stages:
(i) producing a mix of aggregates with a maximum diameter less than or equal to 30 mm and of an amount less than or equal to 0.8 g per square meter of specific surface developed by the aggregates of at least one cationic polymer in the liquid form having a density of cationic charges greater than or equal to 0.5 meq/g and an intrinsic viscosity of from 0.01 to 0.8 dl/g; and
(ii) putting the mix obtained in stage (i) into contact with at least one bituminous binder.

Preferably, the cationic polymer of the process according to the invention has the characteristics described below.

Another subject-matter according to the invention is a bituminous composition comprising at least one bituminous binder, aggregates with a maximum diameter less than or equal to 30 mm and an amount less than or equal to 0.8 g per square meter of specific surface developed by the aggregates of at least one cationic polymer having a density of cationic charges greater than or equal to 0.5 meq/g and an intrinsic viscosity of from 0.01 to 0.8 dl/g.

Advantageously, the cationic polymer of the composition according to the invention has the characteristics described below.

Another subject-matter according to the invention is the use of at least one cationic polymer in the liquid form in the surface treatment of aggregates with a maximum diameter less than or equal to 30 mm intended for the preparation of a bituminous composition, the said cationic polymer having a density of cationic charges greater than or equal to 0.5 meq/g and an intrinsic viscosity of from 0.01 to 0.8 dl/g and being used in an amount less than or equal to 0.8 g of polymer per square meter of specific surface developed by the aggregates.

Advantageously, the cationic polymer of the use according to the invention has the characteristics described below.

The characteristics described below apply to the various subject-matters and variants according to the invention.

The specific surface developed by the aggregates can be obtained according to different methods which are well known to a person skilled in the art, such as, for example, the BET method. Preferably, the specific surface ($\Sigma_{sp}$) developed by the aggregates (expressed in m²/kg) is determined according to the following Formula (I):

$$\Sigma_{sp}=(0.0025 \times G)+(0.023 \times S)+(0.12 \times s)+(1.35 \times f) \quad \text{Formula (I)}$$

in which:
G is the mass percentage of the aggregates to be treated having a diameter of from 6.3 to 30 mm;
S is the mass percentage of the aggregates to be treated having a diameter of from 0.315 to less than 6.3 mm;
s is the mass percentage of the aggregates to be treated having a diameter of from 0.08 to less than 0.315 mm;
f is the mass percentage of the aggregates to be treated having a diameter of strictly less than 0.08 mm.

It is subsequently sufficient to multiply the specific surface obtained by Formula (I) by the total mass of aggregates to be treated in kg in order to obtain the total surface area to be treated, and to multiply this surface area by 0.8 (gramme per square meter of specific surface developed by the aggregates) in order to obtain the total maximum amount of cationic polymer according to the invention to be used to treat the desired aggregates.

The mass percentages of the various fractions of aggregates to be treated (G, S, s and f) of the above Formula (I) can, for example, be obtained by simple sieving with the appropriate sieves, in order to separate the fractions, and by then weighing the obtained fractions. The ratio of the mass of each fraction of aggregates to be treated to the total mass of aggregates to be treated makes it possible to obtain the mass percentage of each fraction of aggregates to be treated.

Advantageously, the aggregates according to the invention are siliceous and/or siliceous/calcareous in nature, preferably siliceous.

According to the invention, a limit on the maximum diameter of the aggregates is provided in so far as the majority of the standards relating to bituminous mixes provide a limitation on the maximum diameter of the aggregates. By way of example, Standard EN 13108-1 provides, for certain bituminous mixes, for the maximum diameter of the aggregates to be less than 20 mm, Standard EN 13043 specifying that less than 2% of the aggregates can have a diameter of 1.4 times the maximum diameter, that is to say 28 mm.

Preferably, the aggregates according to the invention have a maximum diameter less than or equal to 20 mm, advantageously less than or equal to 15 mm.

Cationic Polymer

Preferably, the cationic polymer according to the invention is present in an amount less than or equal to 0.6 g per square meter of specific surface developed by the aggregates, advantageously less than or equal to 0.4 g per square meter of specific surface developed by the aggregates.

Advantageously, the cationic polymer according to the invention is present in an amount greater than or equal to 0.0001 g per square meter of specific surface developed by the aggregates, preferably greater than or equal to 0.0005 g per square meter of specific surface developed by the aggregates, advantageously greater than or equal to 0.0008 g per square meter of specific surface developed by the aggregates and preferably greater than or equal to 0.001 g per square meter of specific surface developed by the aggregates.

Preferably, the cationic polymer according to the invention has a density of cationic charges greater than or equal to 1 meq/g and advantageously greater than or equal to 2 meq/g.

According to the invention, the cationic polymer preferably has a molecular weight expressed by an intrinsic viscosity of from 0.02 to 0.8 dl/g, advantageously from 0.03 to 0.8 dl/g and preferably from 0.04 to 0.8 dl/g.

The cationic polymer according to the invention can have a linear, comb or branched structure. Preferably, the cationic polymer according to the invention is linear.

The cationic groups can in particular be phosphonium, pyridinium, sulphonium, quaternary amine and/or protonated amine groups. Preferably, the cationic groups of the cationic polymers according to the invention are quaternary amine and/or protonated amine groups.

These cationic groups can be situated in the chain of the polymer or as pendant groups.

A large number of cationic polymers are known per se. Such polymers can be obtained directly by one of the known polymerization processes, such as radical polymerization, polycondensation or polyaddition.

They can also be prepared by post-synthetic modification of a polymer, for example by grafting groups carrying one or more cationic functional groups to a polymer chain carrying appropriate reactive groups. Preferably, the polymer is of natural origin.

The polymerization is carried out starting from at least one monomer carrying a cationic group or a suitable precursor.

The polymers obtained from monomers carrying amine and imine groups are particularly useful. The nitrogen can be quaternized after polymerization in a known way, for example by alkylation using an alkylating compound, for example by methyl chloride, or in an acidic medium, by protonation.

Preferably, the cationic polymer according to the invention comprises quaternary amine groups and/or protonated amine groups.

Mention may in particular be made, among monomers already carrying a cationic quaternary amine functional group, of diallyldialkylammonium salts, quaternized dialkylaminoalkyl(meth)acrylates, and (meth)acrylamides N-substituted by a quaternized dialkylaminoalkyl.

The polymerization can be carried out with nonionic monomers, preferably having a short chain, comprising from 2 to 6 carbon atoms. Anionic monomers can also be present in so far as they do not affect the cationic groups.

In the context of the modification of polymers by grafting, mention may be made of grafted natural polymers, such as cationic starches or chitosan.

Mention may be made, by way of example, of cationic polymers of the family of the polyvinylamines, which can be obtained by polymerization of N-vinylformamide, followed by hydrolysis. Quaternized polyvinylamines can be prepared as described in U.S. Pat. No. 5,292,441. Polymers of the polyethyleneimine type are also appropriate. The latter are quaternized by protonation.

Particular preference is given to cationic polymers obtained by polycondensation of epichlorohydrin with a mono- or dialkylamine, in particular methylamine or dimethylamine. Their preparation has been described, for example, in U.S. Pat. No. 3,738,945 and U.S. Pat. No. 3,725,312.

Preferably, the cationic polymer according to the invention is obtainable by:
condensation of epichlorohydrin with a dialkylamine; or
condensation of epichlorohydrin with a monoalkylamine, followed by protonation.

The dialkylamine is preferably dimethylamine. The monoalkylamine is preferably methylamine.

The unit of the cationic polymer obtained by polycondensation of dimethylamine and epichlorohydrin can be represented as follows:

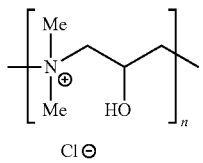

Polymers of the polyacrylamide type which are modified by a Mannich reaction, such as polyacrylamide N-substituted by a dimethylaminomethyl group, are also appropriate.

Cationic polymers obtained by polycondensation of dicyandiamide and formaldehyde are also appropriate. These polymers and their process of preparation are described in Patent FR 1 042 084.

According to a variant, the cationic polymer according to the invention is obtainable by condensation of dicyandiamide with formaldehyde, followed by addition of at least one ammonium salt.

Preferably, the molar ratio of formaldehyde to dicyandiamide is from 0.8/1 to 4/1.

According to an example of an embodiment, the cationic polymer according to the invention comprises a PolyDadmac or polydiallyldimethylammonium chloride.

Treatment

The treatment of the aggregates according to the invention can be carried out by simple mixing, spraying or sprinkling. A mix of aggregates and cationic polymer according to the invention is then obtained.

The cationic polymer according to the invention is used in the liquid form, advantageously in the form of an aqueous solution. The cationic polymer is preferably diluted in a large volume of solvent, in order to facilitate the treatment of the aggregates and to ensure optimum distribution and homogeneous treatment of the aggregates. The concentration of polymer in the solution can then be less than or equal to 30% by mass, preferably less than or equal to 10% by mass.

However, according to a variant of the invention, it can be advantageous, between the production of the cationic polymer and its use in the process according to the invention, to handle the cationic polymer according to the invention in the form of a concentrated solution. This is because, in view of the relatively low molecular weight of the cationic polymers according to the invention, it is possible to use aqueous solutions at high concentrations of polymer without a problem related to high viscosities. It is in particular advantageous to use high concentrations of polymer in order to reduce costs (transportation, storage). According to the present variant, the concentration of polymer in the solution can then be from 40 to 60% by mass.

The dilution of the solution of cationic polymer according to the invention is adjusted as a function of the total surface area of aggregates to be treated and of the intrinsic viscosity of the cationic polymer.

The treatment of the aggregates according to the invention can be carried out with one single cationic polymer or a mix of cationic polymers.

Preferably, mixing is carried out during and/or after the treatment of the aggregates in order to ensure good distribution of the cationic polymer according to the invention and obtain a material which has been homogeneously treated.

The spraying can take place in a container, for example in a baffled box at the outlet of a belt. In addition, this embodiment ensures a low loss of the product. In a variant, it is possible to envisage spraying a solution of the cationic polymer according to the invention into a mixer placed at the belt outlet. It is also possible to envisage preparing a premix of a small amount of aggregates with the cationic polymer according to the invention and then adding this premix to the other aggregates.

Preferably, the maximum diameter of the aggregates according to the invention can be less than or equal to 20 mm and advantageously less than or equal to 15 mm.

According to a variant, the aggregates treated according to the process of the invention may not comprise all the aggregates of the bituminous composition. This is because the treatment of only a portion or only a few fractions of aggregates may be sufficient to produce the desired improved effect of the adhesion between the bituminous binder and the aggregates.

According to another variant of the process according to the invention, only the sands are treated. According to yet another variant of the process according to the invention, only the coarse aggregates are treated. According to yet another variant of the invention, only the fines are treated.

The constituents thus treated can be used in a typical way, in particular in the preparation of bituminous compositions.

In particular, the aggregates thus treated are useful in the preparation of bituminous compositions, in which the clays may interfere with the effectiveness of the adhesion of the bituminous binder to the aggregates. It can be used in a typical way in the preparation of bituminous compositions.

The cationic polymer composition according to the invention is stable over time and withstands heat and frost.

FIG. 1 diagrammatically represents an example of a capillary tube used to determine the intrinsic viscosity of the cationic polymers according to the invention. The references A and B denote two reference points which are used to measure the duration of flow of polymer solutions at different concentrations.

Determination of the Density of Cationic Charges of the Cationic Polymers

The density of cationic charges or cationicity is the amount of charges (in mmol) carried by 1 g of polymer. It is expressed in milliequivalents per gramme (meq/g). This property is measured by colloidal titration by an anionic polymer in the presence of a coloured indicator sensitive to the ionicity of the polymer in excess.

In the present case, it is a matter of quantitatively determining the cationic polymer of unknown ionicity, after having strongly diluted it, by a known anionic polymer in the presence of a coloured indicator (cationic dye). This dye is ortho-toluidine blue and has the characteristic of not being of the same colour in the presence of anionic polymers or of cationic polymers in excess. Thus, in the presence of cationic polymers in excess, the dye solution is blue.

The cationic polymer is then quantitatively determined by an anionic polymer of known ionicity (potassium polyvinyl sulphate). In view of the affinity of the macromolecules of opposed charges, the polymers will instantaneously precipitate. When the cationic polymer is completely consumed, an addition of anionic polymer brings about an excess of this polymer. The colour of the solution then changes from blue to purple. The change in colour corresponds to the neutralization of all the cationic charges of the polymer. The volume of the anionic polymer used and its concentration then make it possible to calculate the cationicity of the cationic polymer.

This is because, at equivalence, the number of moles of negative charges is equal to the number of moles of positive charges.

In the examples below, the cationicity was determined in the following way. 60 ml of a 0.001M, pH 6, sodium phosphate buffer solution and 1 ml of ortho-toluidine blue solution having a concentration of $4.1 \times 10^{-4}$ M were introduced into a suitable container, followed by 0.5 ml of solution of cationic polymer to be quantitatively determined.

This solution was titrated with a solution of potassium polyvinyl sulphate until the colour of the indicator changed.

The cationicity was obtained by the following relationship:

$$\text{Cationicity (meq/g)} = (V_{ekpvs} * N_{kpvs})/(V_{cp} * C_{cp})$$

in which:
$V_{cp}$ is the volume of solution of the cationic polymer in milliliters;
$C_{cp}$ is the concentration of the cationic polymer in solution in grammes per milliliter;
$V_{ekpvs}$ is the volume of solution of potassium polyvinyl sulphate in milliliters; and
$N_{kpvs}$ is the normality of the solution of potassium polyvinyl sulphate in milliequivalents per milliliter.

Measurement of the Intrinsic Viscosity of the Cationic Polymers

There exists a defined relationship between the molecular weight of a polymer and the viscosity of a solution of this same polymer at a given temperature. The higher the molecular weight the more viscous the solution.

This viscosity measurement was carried out by measuring the period of time necessary for the polymer solution to pass through a calibrated tube between reference points A and B (see FIG. 1). The dimensions of the tube were adjusted so that the flow of the solutions was neither too fast, in order to be sufficiently precise in the measurements, nor too slow, in order for the measurements not to take too much time. However, the diameter of the tube had no effect on the final result of the viscosity measurement.

This method requires several stages, which are as follows:
preparing solutions of cationic polymer at different concentrations;
measuring the flow time in the capillary tube between the two reference points A and B (see FIG. 1) for the solvent and each solution of the polymer at different concentrations;
determining the specific viscosity for each concentration by dividing the difference between the flow times of the polymer solution and the solvent by the flow time of the solvent;
determining the reduced viscosity by dividing the specific viscosity by the concentration of the polymer solution; and
determining the intrinsic viscosity by plotting the curve of the reduced viscosity as a function of the concentration of the polymer solution. A straight line is obtained. The intersection with the ordinate of this straight line corresponds to the intrinsic viscosity for a concentration equal to zero.

The intrinsic viscosity is directly related to the molecular weight by the following Mark-Houwink equation:

$$\text{intrinsic } \eta = K' \times M^a$$

$K'$ and $a$ are the Mark-Houwink constants. They are specific to each solvent/polymer pair. M is the molar mass of the polymer in grammes per mole.

The measurements of intrinsic viscosity of the cationic polymers are generally carried out in a 3M NaCl solution, with a capillary viscometer of the Ubbelhode type, at 25° C.

Determination of the Passive Adhesiveness between the Bituminous Binders and the Aggregates The tests were carried out according to Standard XP T 66-043, which stipulates a method for determining the passive adhesiveness between the binders and the aggregates in the presence of water. It applies to all the anhydrous binders and to all the aggregates.

Clean and dry aggregates were coated with the bituminous binder. The coated aggregates were immersed in water under predetermined conditions. The value of the passive adhesiveness was determined by the percentage, evaluated by simple observation with the naked eye, of the surface area of the aggregates which remained covered with bituminous binder after a certain immersion time.

The treatment of the aggregates with the cationic polymer according to the invention was carried out with an addition of 10 g of water in order to ensure a good distribution of the polymer at the surface of the aggregates.

100 g of each type of aggregates were washed and dried at 110° C. for 24 hours and then treated with a concentrated solution of cationic polymer according to the invention. Several tests were carried out for each type of aggregates, the dosage of cationic polymer according to the invention being varied.

After the treatment by the cationic polymer according to the invention, the aggregates were deposited in a drying oven at 170° C. for 3 hours. The bituminous binder was also placed in the same conditions. After 3 hours, 100 g of each sample were coated with 5 g of bituminous binder by simple mixing for 1 minute. At the end of this minute, the samples were again placed in a drying oven for 5 minutes. Subsequently, they were again mixed in order to ensure good coating. Once the coating was complete, the samples were cooled to 20° C. over 24 hours. After 24 hours, each sample was immersed in 300 g of demineralized water for 16 hours in a climate-controlled chamber at 60° C. and 100% relative humidity. The samples were subsequently dried at 20° C.

The results are expressed according to Standard XP T 66-043 (see in particular Appendix B: Guide to grading as a function of the aggregate surface area) as a percentage of aggregate surface area remaining covered with a film of bituminous binder, according to the following grading:
a) no surface area is uncovered;
b) more than 90% of the surface area of the aggregates remains covered; only the edges of the aggregates are devoid of bituminous binder;
c) from 75 to 80% of the surface area of the aggregates remains covered;
d) from 50 to 75% of the surface area of the aggregates remains covered;
e) less than 50% of the surface area of the aggregates remains covered;
f) the bituminous binder is virtually separate from the aggregates; only a few small globules remain.

Preferably, it is desirable for an aggregate not to be e or f and preferably not to be d, e or f for the grade according to Standard XP T 66-043.

Determination of the Quality of the Bituminous Compositions: "Duriez" Test

The quality of the bituminous compositions can in particular be verified via the moisture resistance of the said compositions. In France, moisture resistance of a bituminous composition is determined by the "Duriez" test (see Standard NF P98-251-1).

This test consists of measurements of compressive strengths after storage in the air at 18° C. and 50% humidity for 7 days and measurements of the compressive strengths after immersion in specified conditions (storage in water at 18° C. for 7 days). The moisture resistance of the bituminous composition is expressed by the ratio of the mechanical strengths according to the two storage methods:

Moisture resistance "s/S"=strength after immersion/Strength without immersion.

The French standards require an s/S greater than 0.65 for bituminous-treated gravel and greater than 0.70 for bituminous concretes.

Determination of the Cleanness of the Sands

The cleanness of the sands can be determined by the "methylene blue value". The methylene blue value is a standardized test which makes it possible to estimate the cleanness of a sand by "evaluating" the harmfulness of the impurities present in the sand. This technique (cf. Standard EN 933-9) is sensitive to the presence of clays.

The principle of this test is as follows. It concerns putting into contact a cationic dye (see Formula I below), methylene blue, and the sand to be analysed. The cationic dye is adsorbed on the clay until the anionic sites carried by the latter are saturated. The methylene blue value corresponds to the amount of dye adsorbed at saturation on the particles present in the 0-2 mm fraction present in the sand.

Formula 1: Structural formula of methylene blue

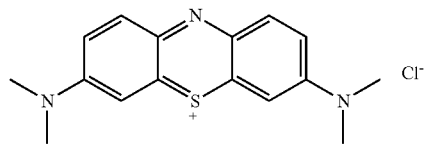

It should be noted that, according to the standards, the methylene blue values have to be less than 2 g, 2.5 g or 3 g of dye per kilogramme of sand as a function of the target application (see Standards NF EN 13043 and XP P 18545, Chapters 8 and 9).

The following examples illustrate the invention without limiting its scope.

EXAMPLES

Example 1

Validation of the Effect of the Treatment of Aggregates by the Cationic Polymer According to the Invention The tests were carried out according to Standard XP T 66-043, which stipulates a method to determine the passive adhesiveness between the binders and the aggregates in the presence of water. This method is described above.

The bituminous binder was a bitumen of grade 35/50 (supplier: Shell).

The cationic polymer was FL2260 (supplier: SNF).

The three types of aggregates which were used in the present example are listed in Table 1.

TABLE 1

| Nature, size and designation of the aggregates | | |
|---|---|---|
| Nature | Size | Designation |
| Siliceous coarse aggregates (rhyolite) | Diameter from 6 to 10 mm | A |
| Siliceous coarse aggregates (alluvial) | Diameter from 6 to 10 mm | B |
| Siliceous coarse aggregates (quartz) | Diameter from 6 to 10 mm | C |

The solution of cationic polymer according to the invention used for the treatment of the aggregates in the present example was diluted to 2.4% by mass of dry polymer relative to the total mass of solution.

The tests were carried out for the following dosages of cationic polymer according to the invention, relative to the specific surface developed by the aggregates: 0, 0.08, 0.16, 0.2 and 0.4 g per square meter of specific surface developed by the aggregates. The results obtained are presented in Table 2 below.

TABLE 2

| Results of the passive adhesiveness test according to Standard XP T 66-043 | | | | | |
|---|---|---|---|---|---|
| Dosage of dry cationic polymer according to the invention in g/m$^2$* (ppm**) | 0 | 0.08 (20) | 0.16 (40) | 0.2 (50) | 0.4 (100) |
| A | d | c | b | b | a |
| B | e | d | d | b | b |
| C | e | d | c | b | c |

*gramme of polymer per square metre of specific surface developed by the aggregates
**parts per million (by mass) of the mass of the aggregates. For example, 100 ppm correspond to 100 g of active material (dry) of cationic polymer according to the invention per 1 000 000 g of aggregates According to Table 2, the positive effect of the cationic polymer according to the invention on the bituminous binder/aggregates adhesion is already visible for dosages as low as 0.08 g per square meter of specific surface developed by the aggregates. This is because the adhesion gradings improved for all the samples starting from this very low dosage of cationic polymer according to the invention. For example, the grading changed from "d" to "c" for sample A between the control and the sample according to the invention comprising 0.08 g per square meter of specific surface developed by the aggregates of cationic polymer. Or again, the passive adhesiveness grading changed from "e" to "d" for sample C between the control and the sample according to the invention comprising 0.08 g per square meter of specific surface developed by the aggregates of cationic polymer.

Overall, the results in Table 2 show that the bituminous binder/aggregates adhesion improves with the increase in the dosage of cationic polymer according to the invention.

Example 2

Validation of the Maximum Limit of the Dosage of Cationic Polymer According to the Invention The protocols to treat the aggregates by the cationic polymer according to the invention, to coat with the bituminous binder and to measure the effectiveness of the treatment of the aggregates with regard to the bituminous binder/aggregates adhesion are virtually the same as in the preceding example.

The difference is that the solution of cationic polymer according to the invention used for the treatment of aggregates in the present example was 62.4% by mass of dry polymer relative to the total mass of solution.

The aggregates used were quartz, the diameter of which was from 6 to 10 mm, and sandstone, the diameter of which was from 6 to 10 mm.

The cationic polymer used was FL2260 (supplier: SNF).

Tables 3 and 4 below show the dosages as dry matter and as diluted matter corresponding to the tests which were carried out.

TABLE 3

Designation and dosage of cationic polymer according to the invention of the quartz samples

| Sample designation | Qref | Q250 | Q500 | Q750 | Q1000 |
|---|---|---|---|---|---|
| Dosage of cationic polymer according to the invention (62.4% dry solids content) (g) | 0 | 0.04 | 0.08 | 0.12 | 0.16 |
| Dosage of dry matter (ppm) | 0 | 250 | 500 | 750 | 1000 |
| Dosage of dry matter (g/m²*) | 0 | 1 | 2 | 3 | 4 |

*gramme of polymer per square metre of specific surface developed by the aggregates

TABLE 4

Designation and dosage of cationic polymer according to the invention of the sandstone samples

| Sample designation | Sref | S250 | S500 | S750 | S1000 |
|---|---|---|---|---|---|
| Dosage of cationic polymer according to the invention (62.4% dry solids content) (g) | 0 | 0.04 | 0.08 | 0.12 | 0.16 |
| Dosage of dry matter (ppm) | 0 | 250 | 500 | 750 | 1000 |
| Dosage of dry matter (g/m²*) | 0 | 1 | 2 | 3 | 4 |

*gramme of polymer per square metre of specific surface developed by the aggregates The results obtained for passive adhesiveness according to Standard XP T 66-043 are shown in Tables 5 and 6.

TABLE 5

Experimental results for the quartz samples

| Quartz | Qref | Q250 | Q500 | Q750 | Q1000 |
|---|---|---|---|---|---|
| Grade | c | d | d | e | e |

TABLE 6

Experimental results for the sandstone samples

| Sandstone | Sref | S250 | S500 | S750 | S1000 |
|---|---|---|---|---|---|
| Grade | b | b | c | d | d |

According to Tables 5 and 6, an increase of stripping with the increase in the dosage of cationic polymer according to the invention is observed starting from 1 g per square meter of specific surface developed by the aggregates. For example, sample Q250 obtains a passive adhesiveness grading "d", whereas sample Q1000 obtains a grading "e". Likewise, sample S250 obtains a grading "b", whereas sample S1000 obtains a grading "d". Consequently, the use of an amount of cationic polymer according to the invention greater than or equal to 1 g per square meter of specific surface developed by the aggregates seems to have a negative effect on the bituminous binder/aggregates adhesion.

Furthermore, it may be observed that the stripping is lower for the sandstone samples than for the quartz samples. There is indeed already a difference between the reference samples ("c" for Qref and "b" for Sref). Subsequently, it was found that a dosage of 1 g per square meter of specific surface developed by the aggregates of cationic polymer according to the invention seemed to be harmful to the bituminous binder/aggregates adhesion of the quartz samples, whereas the negative effect of the cationic polymer according to the invention on the bituminous binder/aggregates adhesion for the sandstone samples only emerged starting at a dosage of 2 g per square meter of specific surface developed by the aggregates. The maximum amount of cationic polymer according to the invention which can be added to the aggregates thus appeared to be variable depending on the nature of the aggregates to be treated.

Examples 1 and 2 show that the bituminous binder/aggregates adhesion improves for a dosage of cationic polymer according to the invention which is non zero and less than a threshold which was experimentally found at approximately 0.8 g per square meter of specific surface developed by the aggregates. For this dosage range of cationic polymer according to the invention, a grading according to Standard XP T 66-043 which was neither e nor f was found, whereas, in the absence of cationic polymer according to the invention or for a dosage of cationic polymer according to the invention greater than 0.8 g per square meter of specific surface developed by the aggregates, it was possible to obtain a grade equal to e. Furthermore, this result was obtained for a specific category of cationic polymer according to the invention defined by a density of cationic charges greater than or equal to 0.5 meq/g and an intrinsic viscosity from 0.01 to 0.8 dl/g.

Example 3

Validation of the Effect of the Treatment of the Aggregates by Another Example of Cationic Polymer According to the Invention The tests were carried out according to Standard XP T 66-043. This method is described above.

The bituminous binder was a bitumen of grade 35/50 (supplier: Shell).

The cationic polymer was a PolyDadmac (reference DP/CR 2780, supplier: SNF).

The solution of cationic polymer according to the invention used for the treatment of the aggregates in the present example was diluted to 10% by mass of dry PolyDadmac polymer relative to the total mass of solution.

The coarse aggregates corresponded to the coarse aggregates C in Table 1.

The tests were carried out for the following dosages of PolyDadmac cationic polymer according to the invention relative to the specific surface developed by the aggregates: 0, 0.16 and 0.32 g per square meter of specific surface developed by the aggregates. The results are presented in Table 7 below.

TABLE 7

Results of the passive adhesiveness test
according to Standard XP T 66-043

Dosage of dry cationic polymer according
to the invention in g/m²* (ppm**)

| | 0 | 0.16 (40) | 0.32 (80) |
|---|---|---|---|
| C | e | d | d |

*gramme of polymer per square metre of specific surface developed by the aggregates

**parts per million (by mass) of the mass of the aggregates. For example, 100 ppm correspond to 100 g of active material (dry) of cationic polymer according to the invention per 1 000 000 g of aggregates According to Table 7, the adhesion gradings improved once the PolyDadmac cationic polymer according to the invention was added, the grading changing from "e" for the sample not comprising the PolyDadmac polymer to "d" for the samples according to the invention comprising 0.016 g and 0.032 g per square meter of specific surface developed by the aggregates of cationic polymer.

Overall, the results in Table 7 show that the bituminous binder/aggregates adhesion improves in the presence of the PolyDadmac cationic polymer according to the invention.

Example 4

Evaluation of the Aggregates and Bituminous Compositions According to the Invention with Contamination by Clays Several aggregates of different natures were contaminated by clays by simple mixing, treated by a cationic polymer according to the invention and used in the production of bituminous compositions. Reference bituminous compositions were produced using the same aggregates without contamination by clays. "Duriez" tests were subsequently carried out according to the protocol as described above in order to evaluate the effectiveness of the cationic polymer according to the invention for this specific application and the effect on the moisture resistance of the produced bituminous compositions.

The aggregates treated were as follows:

Siliceous sand from Pontreaux having a methylene blue value before addition of clay of 0.5 g of blue/kg of sand (supplier: Lafarge)

Limestone sand from Cassis having a methylene blue value before addition of clay of 0.6 g of blue/kg of sand (supplier: Lafarge)

TABLE 8

Particle size of the sands treated

| Sieve (mm) | 0.063 | 0.08 | 0.2 | 0.315 | 0.4 | 0.5 | 0.63 | 1 | 2 | 3.15 | 4 |
|---|---|---|---|---|---|---|---|---|---|---|---|
| Siliceous sand 1 | 11.7 | 12.9 | 20 | 26 | 30 | 35 | 40 | 53 | 81 | 99.3 | 100 |
| Siliceous sand 2 | 8.8 | 9.7 | 16 | 21 | 25 | 28 | 32 | 44 | 75 | 98.9 | 100 |
| Limestone sand 1 | 16.2 | 19.3 | 27 | 35 | 39 | 45 | 53 | 70 | 97 | 99.8 | 100 |
| Limestone sand 2 | 15.9 | 17.4 | 27 | 34 | 39 | 44 | 53 | 68 | 97 | 99.9 | 100 |

The values are expressed as cumulative mass percentage of particles passing through the various sieves. A particle size curve can be plotted from this table (cumulative mass percentage of particles passing through the sieves as a function of the size of the sieves in mm). This table and this curve can in particular make it possible to determine the mass percentages of each of the fractions of aggregates. The treated sands are referred to in the present example as "0/4 sands".

The tests were carried out with 8 formulations as described in Table 9. The notation "BG" corresponds to a formulation of bituminous-treated gravel and the notation "BC" corresponds to a bituminous concrete formulation. All the formulations were adjusted with regard to particle size and content of bituminous binder in order to obtain uniform richness moduli.

The coarse aggregates were rhyolite tuffs from the Rivolet quarry.

The bituminous binder was a pure bitumen of grade 35/50 (supplier: Shell).

TABLE 9

Formulations produced in the present example

| Formulation | Sand 0/4 | Coarse aggregates 2/6 (*) | Coarse aggregates 6/10 () | Coarse aggregates 10/14 (*) | Bituminous binder |
|---|---|---|---|---|---|
| BG1 | 48.1% siliceous sand 1 | 9.6% | 19.3% | 19.3% | 3.7% |
| BC1 | 47.5% siliceous sand 1 | 14.3% | 33.3% | — | 4.9% |
| BG2 | 48.1% siliceous sand 1 | 9.6% | 19.2% | 19.2% | 3.9% |
| BC2 | 47.4% siliceous sand 2 | 14.2% | 33.2% | — | 5.2% |
| BG3 | 48.0% limestone sand 2 | 9.6% | 19.2% | 19.2% | 4.0% |

TABLE 9-continued

Formulations produced in the present example

| Formulation | Sand 0/4 | Coarse aggregates 2/6 (*) | Coarse aggregates 6/10 () | Coarse aggregates 10/14 (*) | Bituminous binder |
|---|---|---|---|---|---|
| BC3 | 47.3% limestone sand 2 | 14.2% | 33.1% | — | 5.4% |
| BG4 | 44.1% limestone sand 1 | 11.5% | 20.2% | 20.2% | 4.0% |
| BC4 | 43.5% limestone sand 1 | 16.1% | 35% | — | 5.4% |

(*) 2/6 means that the coarse aggregates have a particle size of from 2 to 6 mm.
(**) 6/10 means that the coarse aggregates have a particle size of from 6 to 10 mm.
(***) 10/14 means that the coarse aggregates have a particle size of from 10 to 14 mm.

The percentages are mass percentages relative to the total mass of the formulation.

The formulations described in Table 9 above were produced according to the following protocol:
heating the aggregates and the bituminous binder in a drying oven up to a temperature of 170° C.±5° C.; and
mixing the preheated aggregates and bituminous binder for 1 min 30 in a heating mixer adjusted to a temperature of 170° C.±5° C.

The formulations thus obtained were compacted in cylindrical moulds for 5 minutes while following the rules below:
for the bituminous concretes: mould with a diameter of 80 mm, compacting load of 60 kN and mass of the obtained test specimen of 1000 g; and
for the bituminous-treated gravel: mould with a diameter of 120 mm, compacting load of 120 kN and mass of the obtained test specimen of 3500 g.

The cationic polymer used for the treatment of the sands was FL2260 (supplier: SNF).

The sand was treated according to the following protocol:
30 kg of 0/4 sand were mixed with the cationic polymer according to the invention, in the proportions described in Table 10 below, in a mixer of Rayneri type at speed 1 for 5 minutes; and
the mix obtained was dried in a drying oven at a temperature of 60-70° C.

The results obtained for the Duriez tests are presented in the following Table 10.

TABLE 10

Results of the Duriez tests carried out on two types of aggregates

| Formulation | Contamination by montmorillonite clay (mass percentage by relative to the mass of contaminated aggregates) | Treatment by the cationic polymer according to the invention (mass percentage of dry polymer relative to the mass of aggregates treated) | 7 days Bituminous-treated gravel (BG) | 14 days Bituminous-treated gravel (BG) | 7 days Bituminous concrete (BC) | 14 days Bituminous concrete (BC) |
|---|---|---|---|---|---|---|
| BG1 and BC1 | 2% | None | 0.63 | 0.52 | 0.85 | 0.70 |
| BG2 and BC2 | 2% | 0.1% | 0.96 | 0.9 | 0.85 | 0.81 |
| BG3 and BC3 | 2% | None | 0.74 | 0.64 | 0.81 | 0.71 |
| BG4 and BC4 | 2% | 0.12% | 0.97 | 0.92 | 0.94 | 0.84 |

It should be remembered that the French standards require an s/S greater than 0.65 for bituminous-treated gravel and greater than 0.70 for bituminous concretes.

According to Table 10, it was found that, for a siliceous sand without treatment (BG1 and BC1), the values obtained by the Duriez test were less than 0.65 for the bituminous-treated gravel at 14 days (0.52) and were just on the limit of 0.70 for the bituminous concrete at 14 days (0.70). On the other hand, the values were far above the limits set by the standards for the siliceous sand treated with the cationic polymer according to the invention (BG2 and BC2: 0.9 for the bituminous-treated gravel at 14 days and 0.81 for the bituminous concrete at 14 days).

On another hand, in the case of a limestone sand without treatment (BG3 and BC3), the values obtained by the Duriez test were just on the limit of the values set by the standards at 14 days (0.64 for the bituminous-treated gravel at 14 days and 0.71 for the bituminous concrete). In contrast, the values were far above the limits set by the standards for the limestone sand treated with the cationic polymer according to the invention (BG4 and BC4: 0.92 for the bituminous-treated gravel at 14 days and 0.84 for the bituminous concrete at 14 days).

Consequently, it is possible to use sands contaminated by 2% of montmorillonites, which have a methylene blue value equal to 4 after contamination, to obtain bituminous compositions having a satisfactory moisture resistance by virtue of the cationic polymer according to the invention.

It is thus possible to use aggregates which would not be usable, in particular due to the presence of clays, and thus due to an excessively high methylene blue value with respect to the requirements of the standards. The moisture resistance improves in all cases by virtue of the process according to the invention.

Example 4 shows that, with the treatment of the sands by a cationic polymer according to the invention for a dosage of approximately 0.1% (i.e., approximately 0.03 g per square meter of specific surface developed by the aggregates), an improvement is obtained in the values for the Duriez tests on bituminous compositions comprising aggregates contaminated by clays and treated, compared to bituminous compositions comprising clay-contaminated and un-treated aggregates.

Example 5

Evaluation of the Aggregates and Bituminous Compositions According to the Invention Bituminous compositions were produced and "Duriez" tests were subsequently carried out according to the protocol as described above in order to evaluate the effectiveness of the cationic polymer according to the invention in this specific application as well as the effect on the moisture resistance of the produced bituminous compositions.

The treated aggregates were as follows:

Fine sand 0/2 mm having a methylene blue value before treatment of 2.2 g of blue/kg of sand (supplier: Lafarge, Bréfauchet site)

Coarse aggregates 6/10 mm (supplier: Lafarge, Bréfauchet site)

TABLE 11

Particle size of the treated aggregates

| Sieve (mm) | Fine sand 0/2 mm | Coarse aggregates 6/10 mm |
|---|---|---|
| 20 | 100 | 100 |
| 16 | 100 | 100 |
| 14 | 100 | 100 |
| 12.5 | 100 | 99.9 |
| 10 | 100 | 95.1 |
| 8 | 100 | 54.1 |
| 6.3 | 100 | 11.7 |
| 5 | 100 | 6.1 |
| 4 | 99.9 | 2.7 |
| 2 | 87.4 | 2.2 |
| 1 | 59.9 | 1.8 |
| 0.315 | 39.4 | 1.7 |
| 0.250 | 33.5 | 1.7 |
| 0.125 | 24.5 | 1.6 |
| 0.080 | 18.6 | 1.5 |
| 0.063 | 16.0 | 1.4 |

The values are expressed as cumulative mass percentage of particles passing through the various sieves. The sands treated are referred to in the present example as "0/2 sands".

The tests were carried out with a bituminous concrete formulation as described in Table 12 below. It is an example of a formulation of the thin bituminous type of concrete, type A, with a discontinuity in particle sizes between 2 and 6 mm. This type of bituminous concrete is used in particular to produce wearing courses having a thickness of 3 to 5 cm.

The bituminous binder was a pure bitumen of grade 40/60 (supplier: Shell)

TABLE 12

Formulation produced in the present example

| Formulation | Sand 0/2 (*) | Coarse aggregates 6/10 (**) | Bituminous binder |
|---|---|---|---|
| BC5 and BC6 | 36% | 58.8% | 5.2% |

(*) 0/2 means that the sand has a particle size of from 0 to 2 mm.
(**) 6/10 means that the coarse aggregates have a particle size of from 6 to 10 mm.

The percentages are mass percentages relative to the total mass of the formulation.

The bituminous mixes according to the formulation described in Table 12 were produced according to the following protocol:

heating the aggregates and the bituminous binder in a drying oven up to a temperature of 170° C.±5° C.; and mixing the preheated aggregates and bituminous binder for 1 min 30 in a heating mixer adjusted to a temperature of 170° C.±5° C.

The obtained bituminous mixes were compacted in cylindrical moulds for 5 minutes. The moulds had a diameter of 80 mm. The compacting load used was 60 kN and the mass of the test specimen obtained was 1000 g.

The cationic polymer used in the treatment of the sand and coarse aggregates was FL2260 (supplier: SNF).

The sand was treated according to the following protocol:

the sand 0/2 was mixed with the cationic polymer according to the invention, in the proportions described in Table 13 below, in a mixer of the Rayneri type at speed 1 for 5 minutes; and the mix obtained was dried in a drying oven at a temperature of 105° C.

The coarse aggregates were treated separately from the sand in an analogous way to the treatment of the sand.

The results obtained for the Duriez tests are presented in the following Table 13.

TABLE 13

Results of the Duriez tests carried out on two types of aggregates

| Formulation | Treatment by the cationic polymer according to the invention (mass percent of dry polymer relative to the mass of aggregates treated) | 7 days | 14 days |
|---|---|---|---|
| BC1 | None | 0.94 | 0.83 |
| BC5 | 0.05% for the sand (500 ppm) 0.01% for the coarse aggregates (100 ppm) | 0.92 | 0.90 |

It should be remembered that the French standards require an s/S greater than 0.8 for thin bituminous concretes of type A.

According to Table 13, it was found that the value obtained for the bituminous concrete BC5 comprising treated aggregates at 14 days (0.90) was greater than the value obtained for the bituminous concrete BC4 comprising untreated aggregates at 14 days (0.83).

If, for the Duriez tests, the ratio s/S is determined by using, for the value S, the compressive strength of the bituminous concrete without immersion and comprising untreated aggregates, a value s/S of 1.11 at 7 days and of 1.08 at 14 days is obtained for the bituminous concrete BC5. The treatment according to the invention thus makes it possible to obtain treated aggregates having a value of strength after immersion which is very close to that obtained without treatment and without immersion.

Example 5 shows that, with the treatment of the sands by a cationic polymer according to the invention, for a dosage of approximately 0.05% (i.e., approximately 0.037 g per square meter of specific surface developed by the aggregates) and the treatment of the coarse aggregates by a cationic polymer according to the invention for a dosage of approximately 0.01% (i.e., approximately 0.74 g per square meter of specific surface developed by the aggregates), bituminous compositions were further obtained, comprising the treated aggregates and subjected to an immersion having substantially the same strengths as bituminous compositions comprising untreated aggregates and not subjected to immersion.

The invention claimed is:

1. A process for the production of a bituminous composition, comprising:
   (i) producing a mix of aggregates with a maximum diameter which is non-zero and less than or equal to 30 mm and of an amount less than or equal to 0.8 g per square meter of specific surface developed by the aggregates of at least one cationic polymer in the liquid form having a density of cationic charges greater than or equal to 0.5 meq/g and an intrinsic viscosity from 0.01 to 0.8 dl/g, the intrinsic viscosity being measured at 25° C. in a 3M NaCl solution with a capillary viscometer of the Ubbelhode type, the specific surface ($\Sigma_{sp}$) developed by the aggregates being determined according to the following Formula (I):

$$\Sigma_{sp}=(0.0025 \times G)+(0.023 \times S)+(0.12 \times s)+(1.35 \times f) \quad \text{Formula (I)}$$

in which:
   G is the mass percentage of the aggregates having a diameter of from 6.3 to 30 mm;
   S is the mass percentage of the aggregates having a diameter of from 0.315 to less than 6.3 mm;
   s is the mass percentage of the aggregates having a diameter of from 0.08 to less than 0.315 mm;
   f is the mass percentage of the aggregates having a diameter of strictly less than 0.08 mm; and
   (ii) putting the mix obtained in stage (i) into contact with at least one bituminous binder.

2. The process according to claim 1, wherein the mix obtained in stage (i) comprises an amount of cationic polymer greater than or equal to 0.0001 g per square meter of specific surface developed by the aggregates.

3. The process according to claim 1, wherein the cationic polymer comprises quaternary amine groups and/or protonated amine groups.

4. The process according to claim 1, wherein the cationic polymer is obtained by:
   condensation of epichlorohydrin with a dialkylamine; or
   condensation of epichlorohydrin with a monoalkylamine, followed by protonation.

5. The process according to claim 1, wherein the cationic polymer is obtained by condensation of dicyandiamide with formaldehyde, followed by addition of at least one ammonium salt.

6. The process according to claim 5, wherein the molar ratio of formaldehyde to dicyandiamide is from 0.8/1 to 4/1.

7. A bituminous composition comprising at least one bituminous binder, aggregates with a maximum diameter which is non-zero and less than or equal to 30 mm and an amount less than or equal to 0.8 g per square meter of specific surface developed by the aggregates of at least one cationic polymer having a density of cationic charges greater than or equal to 0.5 meq/g and an intrinsic viscosity of from 0.01 to 0.8 dl/g, the intrinsic viscosity being measured at 25° C. in a 3M NaCl solution with a capillary viscometer of Ubbelhode type, the specific surface ($\Sigma_{sp}$) developed by the aggregates being determined according to the following Formula (I):

$$\Sigma_{sp}=(0.0025 \times G)+(0.023 \times S)+(0.12 \times s)+(1.35 \times f) \quad \text{Formula (I)}$$

in which:
G is the mass percentage of the aggregates having a diameter of from 6.3 to 30 mm;
S is the mass percentage of the aggregates having a diameter of from 0.315 to less than 6.3 mm;
s is the mass percentage of the aggregates having a diameter of from 0.08 to less than 0.315 mm;
f is the mass percentage of the aggregates having a diameter of strictly less than 0.08 mm.

8. A method comprising using at least one cationic polymer in the liquid form in the surface treatment of aggregates with a maximum diameter which is non-zero and less than or equal to 30 mm intended for the preparation of a bituminous composition, said cationic polymer having a density of cationic charges greater than or equal to 0.5 meq/g and an intrinsic viscosity from 0.01 to 0.8 dl/g and being used in an amount of less than or equal to 0.8 g of polymer per square meter of specific surface developed by the aggregates, the intrinsic viscosity being measured at 25° C. in a 3M NaCl solution with a capillary viscometer of the Ubbelhode type, the specific surface ($\Sigma_{sp}$) developed by the aggregates being determined according to the following Formula (I):

$$\Sigma_{sp}=(0.0025 \times G)+(0.023 \times S)+(0.12 \times s)+(1.35 \times f) \quad \text{Formula (I)}$$

in which:
G is the mass percentage of the aggregates having a diameter of from 6.3 to 30 mm;
S is the mass percentage of the aggregates having a diameter of from 0.315 to less than 6.3 mm;
s is the mass percentage of the aggregates having a diameter of from 0.08 to less than 0.315 mm;
f is the mass percentage of the aggregates having a diameter of strictly less than 0.08 mm.

\* \* \* \* \*